(12) United States Patent
Hiroyuki

(10) Patent No.: US 7,333,428 B2
(45) Date of Patent: Feb. 19, 2008

(54) PATH PAIR DESIGNING METHOD, PATH PAIR DESIGNING DEVICE AND PROGRAM FOR CAUSING COMPUTER TO EXECUTE SAME METHOD

(75) Inventor: Saito Hiroyuki, Minato-Ku (JP)

(73) Assignee: NEC Corporation, Tokyo (JP)

( * ) Notice: Subject to any disclaimer, the term of this patent is extended or adjusted under 35 U.S.C. 154(b) by 956 days.

(21) Appl. No.: 10/158,132

(22) Filed: May 31, 2002

(65) Prior Publication Data

US 2003/0043746 A1 Mar. 6, 2003

(30) Foreign Application Priority Data

May 31, 2001 (JP) .............................. 2001-165037

(51) Int. Cl.
*G01R 31/08* (2006.01)
(52) U.S. Cl. ..................................... 370/228
(58) Field of Classification Search ................ 370/216, 370/225, 228, 254–255; 340/825.01
See application file for complete search history.

(56) References Cited

U.S. PATENT DOCUMENTS 5,577,030 A * 11/1996 Oki et al. .................... 370/351
7,113,506 B1 * 9/2006 Cao ............................ 370/388

FOREIGN PATENT DOCUMENTS

JP 01-180157 7/1989

OTHER PUBLICATIONS

Iraschko, R.R.; Grover, W.D., "A highly efficient path-restoration protocol for management of optical network transport integrity," Selected Areas in Communications, IEEE Journal on , vol. 18, No. 5pp. 779-794, May 2000.*
Fumagalli, A.; Valcarenghi, L., "The preplanned weighted restoration scheme," High Performance Switching and Routing, 2001 IEEE Workshop on , vol., No.pp. 36-41, 2001.*
Ishida, K et al., "A routing protocol for finding two node-disjoint paths in computer networks" Network Protocols, 1995. Proceedings., 1995 International Conference on, vol., Iss., Nov. 7-10, 1995 p. 340-347.*

(Continued)

*Primary Examiner*—Doris H. To
*Assistant Examiner*—Kerri M. Rose
(74) *Attorney, Agent, or Firm*—Young & Thompson

(57) ABSTRACT

A path pair designing method is provided which enables a sure creation of a path pair so long as a network having a configuration that allows the path pair to be created is employed. The path pair designing method includes a first step of producing an objective function to be used as a reference for selection of the path pair, a second step of producing a first constraint expression to be used as a condition required for acquiring the path pair, a third step of producing a second constraint expression to be used as a condition required to put each of communication paths making up the path pair into a disjoint state, and a fourth step of solving a mathematical programming problem made up of the objective function produced in the first step, the first constraint expressions produced in the second step and the second constraint expressions produced in the third step, and of selecting the disjoint path pair.

9 Claims, 3 Drawing Sheets

OTHER PUBLICATIONS

Asakura Publishing Co., "Optimization Handbook", 1995, pp. 242-244.

Yano, *Mathematics Handbook*, 1985, pp. 1040-1047 and 1097-1100.

R.. G. Ogier et al., "Distributed Algorithms for Computing Shortest Paris of Disjoint Paths", *IEEE Transactions On Information Theory*, vol. 39, No. 2, Mar. 1993, pp. 443-455.

T. Tabe et al., "Implementation of an ATM Network Design Tool", *Technical Report of Institute of Electronics, Information and Communication Engineers* SSE98-105, vol. 98, No. 298, 1998.

D. A. Dunn et al., "Comparison of κ-Shortest Paths and Maximum Flow Routing for Network Facility Restoration", *IEEE Journal on Selected Areas in Communications*, vol. 12, No. 1, Jan. 1994, pp. 88-99.

\* cited by examiner

PATH PAIR DESIGNING METHOD, PATH PAIR DESIGNING DEVICE AND PROGRAM FOR CAUSING COMPUTER TO EXECUTE SAME METHOD

BACKGROUND OF THE INVENTION

1. Field of the Invention

The present invention relates to a path pair designing method and a path pair designing device to create two pieces of disjoint communication paths that do not pass through a same node or a same link on a network, and to a program for causing a computer to execute a path pair designing method.

The present application claims priority of Japanese Patent Application No.2001-165037 filed on May 31,2001, which is hereby incorporated by reference.

2. Description of the Related Art

When specified communication paths are to be created in a network to which a plurality of nodes are connected through links serving as a transmission line, as a typical method of designing the communication path, a "Dijkstra" method (for example, as disclosed in "Optimization Handbook" translated by Masao Iri, Hiroshi Imano, Kaoru Tone, 1995, Asakura Publishing Co., Ltd.) is known.

The Dijkstra method is a way to find out a path having a minimum metric between an entrance node used to guide a packet or a like into a network and an exit node used to guide the packet or the like outside the network. The metric is an index used when a path is found on a network and, as the metric, for example, a number of hops (number of nodes through which a packet or a like passes), delay time, bandwidth, costs or a like are used.

Conventionally, when two disjoint communication paths (hereinafter referred to as a "path pair") which do not pass through a same node or a same link are created so as to have redundancy, one path (communication path) is designed first by using the Dijkstra method and then another path is designed, after excluding the node or link that has been already used in designing the above one path, again using by the Dijkstra method.

One concrete example of a method of designing the path pair on a network by using the Dijkstra method described above will be explained below by referring to FIG. 4. FIG. 4 is a schematic block diagram illustrating one example of a communication path created by the conventional path pair designing method.

As shown in FIG. 4, a path pair is designed between an entrance node n1 to an exit node n8, for example, on a network having eight pieces of nodes n1 to n8 each being connected by each of links. Moreover, each of the links is expressed as "(na, nb)" (a and b are positive numbers). For example, a link to connect the node n1 to the node n2 is expressed as "(n1, n2)". Each of the links, shown in FIG. 4, to establish connection among the links is provided with both an upward transmission line and a downward transmission line. For example, each of the links (n1, n2) has both a transmission line to transmit a packet or a like from the node n1 to the node n2 and a transmission line to transmit a packet or a like from the node n2 to the node n1. Moreover, a value indicated by an italicized letter represents a metric value of each of the links. In the example shown in FIG. 4, the metric value for all the links is 1.0. In FIG. 4, only one link between the nodes is shown, however, a plurality of links may be connected between the nodes.

When a path pair is to be created between the entrance node n1 to the exit node n8 in such the network as described above, in the conventional method of designing the path pair, first by using the Dijkstra method, a path is created so that it has a minimum metric value between the node n1 to the node n8. In the example, since the metric value of all links is 1.0, as a path that can provide a minimum metric value between the entrance node n1 to the exit node n8, a path p1 as shown in FIG. 4 is available.

Then, to create a disjoint path not using a same node or a same link as is used for the path p1, all of node n3, node n6, link (n1, n3), link (n3, n6), and link (n6, n8) are removed. However, if so, other paths to transmit a packet or a like from the entrance node n1 to the exit node n8 can not be created.

However, as is apparent from FIG. 4, it is possible to create two paths, one using the node n1-node n2-node n4-node n6-node n8 and another using the node n1-node n3-node n5-node n7-node n8. That is, the network shown in FIG. 4 is so constructed as to create a disjoint path pair.

Therefore, even if a network is so constructed in such a manner to allow a path pair to be created, it is nevertheless impossible to create the path pair so long as the conventional method of designing the path pair is employed in some cases.

Moreover, if the conventional method of designing the path pair is employed, since only such a path as has metric values being in specified order can be selected, for example, a path having a minimum value and a path having a second smallest metric value can be selected, such processing as allows a path pair being a disjoint path pair and the path pair having a smallest path to be selected can not be performed.

SUMMARY OF THE INVENTION

In view of the above, it is an object of the present invention to provide a path pair designing method and a path pair designing device which enables a sure creating of a path pair so long as a network having a configuration that allows the path pair to be created is employed, and to a program for causing a computer to executing a path pair designing method.

According to a first aspect of the present invention, there is provided a path pair designing method for creating a path pair made up of two disjoint communication paths that do not pass through a same node or a same link on a network, the path pair designing method including:

a first step of producing an objective function to be used as a reference at a time of selecting optimized the path pair;

a second step of producing a first constraint expression to be used as a condition required to obtain the path pair;

a third step of producing a constraint expression to be used as a second condition required to put each of the communication paths making up the path pair into a disjoint state; and a fourth step of solving a mathematical programming problem made up of the objective function produced in the first step, the first constraint expressions produced in the second step and the second constraint expressions produced in the third step, and of selecting disjoint the path pair.

In the first aspect, a preference mode is one that wherein further includes an additional step of producing a third constraint expression indicating a constraint condition of a metric which designates at least either of an upper limit value or a lower limit value of a metric of the communication path making up the path pair, hereby in the fourth step, solving the mathematical programming problem, adding the third constraint expression produced in the additional step.

According to a second aspect of the present invention, there is provided a path pair designing device for creating a path pair made up of two disjoint communication paths that do not pass through a same node or a same link on a network, including:

a processing unit to perform a first process of producing an objective function to be used as a reference at a time of selecting of optimized the path pair;

a second process of producing a first constraint expression to be used as a condition required to obtain the path pair;

a third process of producing a second constraint expression to be used as a condition required to put each of the communication paths making up the path pair into a disjoint state; and a fourth process of solving mathematical programming problem made up of the objective function produced in the first process, the first constraint expression produced in the second process and the second constraint expression produced in the third process, and of selecting disjoint the path pair.

In the second aspect, a preference mode is one wherein the processing unit further includes an additional process of producing a third constraint expression indicating a constraint condition of a metric which designates at least either of an upper limit value or a lower limit value of a metric of each of the communication paths making up the path pair, and whereby in the fourth process, the processing unit performs to solve the mathematical programming problem, adding the third constraint expression produced in the additional process.

According to a third aspect of the present invention, there is provided a program for causing a computer to produce a path pair made up of two disjoint communication paths that do not pass through a same node or a same link on a network, the program including:

a first process of producing an objective function to be used as a reference at a time of selecting optimized the path pair;

a second process of producing a first constraint expression to be used as a condition required to obtain the path pair;

a third process of producing a second constraint expression to be used as a condition required to put each of the communication paths making up the path pair into a disjoint state; and a fourth process of solving mathematical programming problem made up of the objective function produced in the first process, the first constraint expression produced in the second process and the second constraint expression produced in the third process, and of selecting disjoint the path pair.

In the third aspect, a preference mode is one that wherein further includes an additional process of producing a third constraint expression indicating a constraint condition of a metric which designates at least either of an upper limit value or a lower limit value of a metric of each of the communication paths making up the path pair and whereby in the fourth process, the program causes the computer to solve the mathematical programming problem, adding the third constraint expression produced in the additional process.

With above configurations, by producing a constraint expression to be used as a condition required to obtain a path pair through processing of creating a path pair condition and by having the produced constraint expression involved in mathematical programming problems and by solving the mathematical programming problems, unlike in the case of the conventional path pair designing method in which a path is created one by one, two paths can be simultaneously selected. Moreover, by producing a constraint expression required to select a disjoint path through processing of creating a disjoint condition and by having the produced constraint expression involved in mathematical programming problems, so long as a network having a configuration that enables a disjoint path pair to be obtained is used, two disjoint paths can be surely selected.

Therefore, if the network has such a configuration that enables a disjoint path pair not using a same node or a same link to be created, it is possible to surely acquire a disjoint path pair.

Also, by changing a reference for selection of a path pair using an objective function to be produced by processing of creating an optimized reference, for example, a path pair or a like in which a metric of a path having a larger metric becomes minimum can be selected out of two paths making up the path pair.

Furthermore, by producing, through processing of creating a path metric constraint, a constraint expression to be used as a constraint condition which designates either of an upper limit or a lower limit value of a metric of a communication path making up a path pair and by having the produced constraint expression involved in the mathematical programming problems and by solving the mathematical programming problems, for example, even if a path pair having a metric being different between an upward flow and a downward flow is created, an optimized path pair can be obtained.

BRIEF DESCRIPTION OF THE DRAWINGS

The above and other objects, advantages, and features of the present invention will be more apparent from the following description taken in conjunction with the accompanying drawings in which.

DETAILED DESCRIPTION OF THE PREFERRED EMBODIMENTS

Best modes of carrying out the present invention will be described in further detail using various embodiments with reference to the accompanying drawings.

Figure 1:
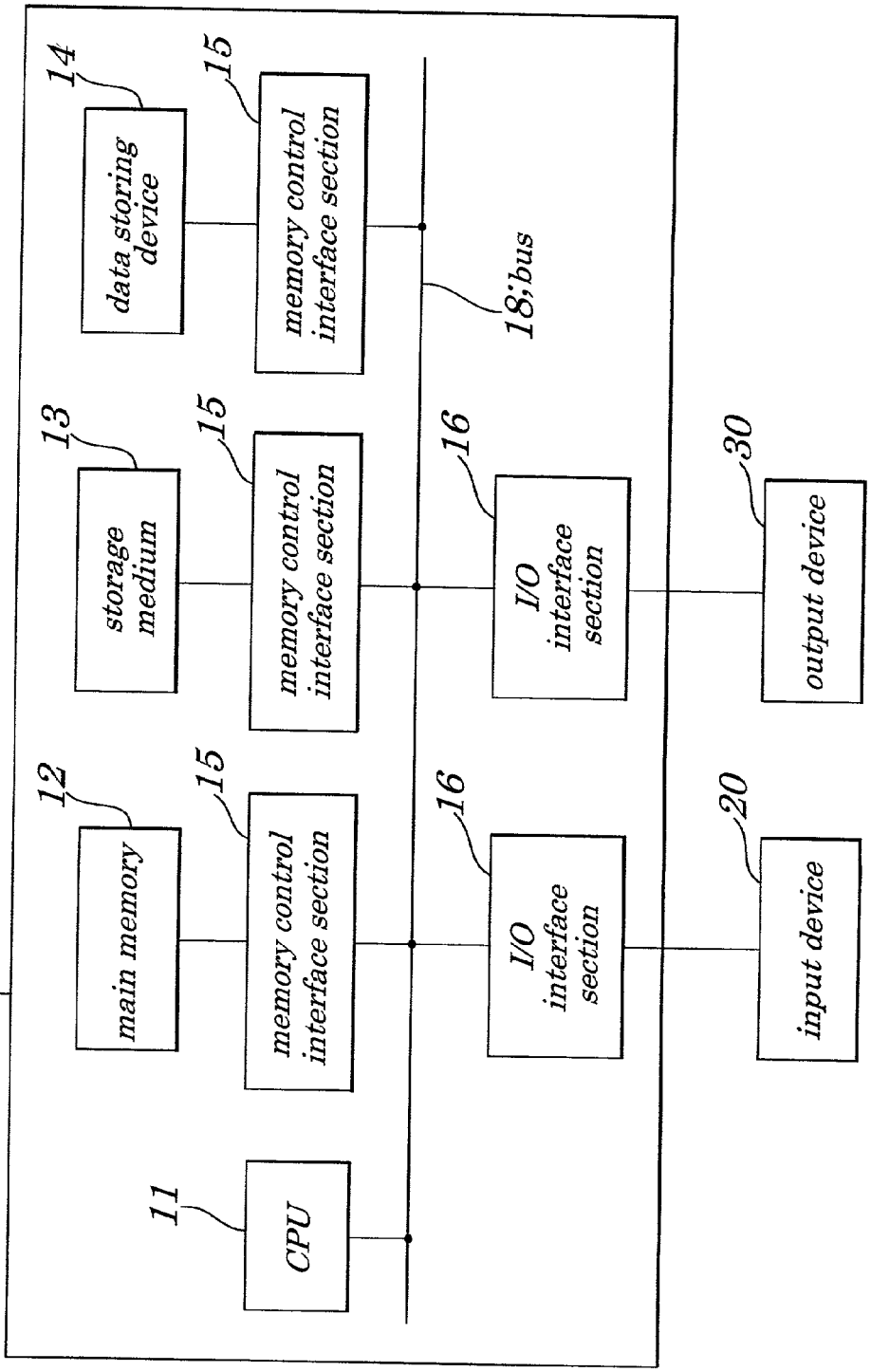
FIG. 1 is a block diagram showing one example of a configuration of a path pair designing device of the present invention.

FIG. 1 is a block diagram showing one example of a configuration of a path pair designing device of the present invention. As shown in FIG. 1, the path pair designing device of the present invention is an information processing device such as a workstation server computer or a like, and includes a processing device 10 to perform specified processing according to a program, an input device 20 to input a command, information or a like to the processing device 10 and an output device 30 to monitor a processing result fed from the processing device 10.

The processing device 10 has a CPU (Central Processing Unit) 11, a main memory 12 to temporarily store information required for processing by the CPU 11, a storage medium 13 to store a control program to have the CPU 11 perform creation of a path pair, a data storing device 14 to store information about each node or each link being components of a network or information required for designing a path pair such as a metric value or a link or a like, a memory control interface section 15 to control data transfer among the main memory 12, storage medium 13, and data storing device 14, and an I/O interface section 16 serving as an interface device between the input device 20 and the output device 30. The above components are connected to one another through buses 18. Moreover, when the path pair is connected to a node or a like being a component of the network, a communication control device serving as an interface used to control communications with the node may be mounted.

The processing device 10 reads a control program being stored in the storage medium 13 and performs processing of designing a path pair described below according to the control program. Moreover, as the storage medium 13, a magnetic disk, semiconductor memory, optical disk, or other storage medium may be used.

In the data storing device 14 in the path pair designing device are input and stored in advance data required for designing a path pair such as information to identify each node or each link, information about configurations of a network, and information needed for designing including metric values of each link.

In order to surely select the path pair from a network, a constraint condition to obtain two paths and a constraint condition required to put these two paths into a state of a disjoint relation. Also, if there is a limitation in processing capability (capacity) of a node or a link, a constraint condition to have a metric value in each route fall within a specified range is made necessary. Moreover, it is necessary to designate a reference (which minimizes, for example, a bandwidth, delay, line cost or a like), on a basis of which the path pair is to be selected.

The path pair designing device of the present invention produces, by using information required for designing the path pair, various constraint conditions described above and objective functions to be used as references for selection of the path pair. Then, by solving mathematical programming problems containing the produced constraint conditions and objective functions, two paths to satisfy these constraint conditions and objective functions can be simultaneously selected and created.

Next, procedures of designing a path pair of the present invention will be described below.

In the description below, no passage of a path through a same node is called "node disjoint" and no passage of a path through a same link is called "link disjoint". Also, set of a plurality of links establishing connection between same nodes is called a "link group" and no passage of a path through a same link group is called "link group disjoint". However, the word "disjoint" when being called singly represents at least one of the node disjoint, link disjoint, and link group disjoint, or all cases of the node disjoint, link disjoint, and link group disjoint.

Moreover, the information processing device shown in FIG. 1 is used as each of the path pair designing devices also in the first to sixth embodiments each describing a method for designing a path pair.

First, symbols used in the following description are explained.

P: This represents set of commodities. One commodity is equivalent to one path. Therefore, a number of commodities of one path pair is two. Each element (in this case, a single path) is represented as "p". In the case of the path pair, each of the elements becomes p1 and p2.

N: This represents set of nodes.

$N^{nec}$: This represents set of nodes which are excluded due to a state of the node disjoint. Each of elements is represented as "n".

s: This represents an entrance node of a path pair to be obtained.

t: This represents an exit node of a path pair to be obtained.

L: This represents set of links. Elements are expressed as (i, j, k). The "i" denotes a sending node, "j" denotes an arriving node, and "k" denotes an identifier used to identify each link in a case where there is a plurality of links among same nodes. When a packet or a like flows upward and downward, though a direction of the flow is reverse, links used then are same, that is, the links (i, j, k) are used for the upward flow and the links (j, i, k) are used for the downward flow.

M: This represents set of a link group. This represents set of links that can not be used by one path making up a path pair if a link belonging to this group is used by another path making up the pair path when there is a plurality of links being connected to same nodes at their both ends.

When viewed from a standpoint of a failure of a network, the set is a group of links that simultaneously suffer a failure. Each element is "m".

$M^{nec}$: This represents set of a link group which is excluded due to a state of link disjoint.

$L^m$: This represents set of a link belonging to a link group "m".

g (i, j, k): This represents a metric of a link (i, j, k)

$g_p$: This represents a metric of a path "p". $g^{route-ul}$: This represents an upper limit value of a metric of a path.

$g^{route-ll}$: This represents a lower limit value of a metric of a path.

$g^{route-ul}$: This represents an upper limit value of a link metric.

$g^{link-ul}$: This represents a lower limit value of a link metric. $x^p$(i, j, k): This represents an amount of a flow that comes out from a node i to a node j in the commodity (path) "p".

Q: This represents weight that is given to one path when a metric of a path making up one path pair is used by specified processing with priority. For example, this is given as a coefficient to be used for multiplying a metric of a path having a bigger metric when a metric of a path having a smaller metric is used with priority ($0 \leq Q \leq 1$).

First Embodiment

Figure 2:
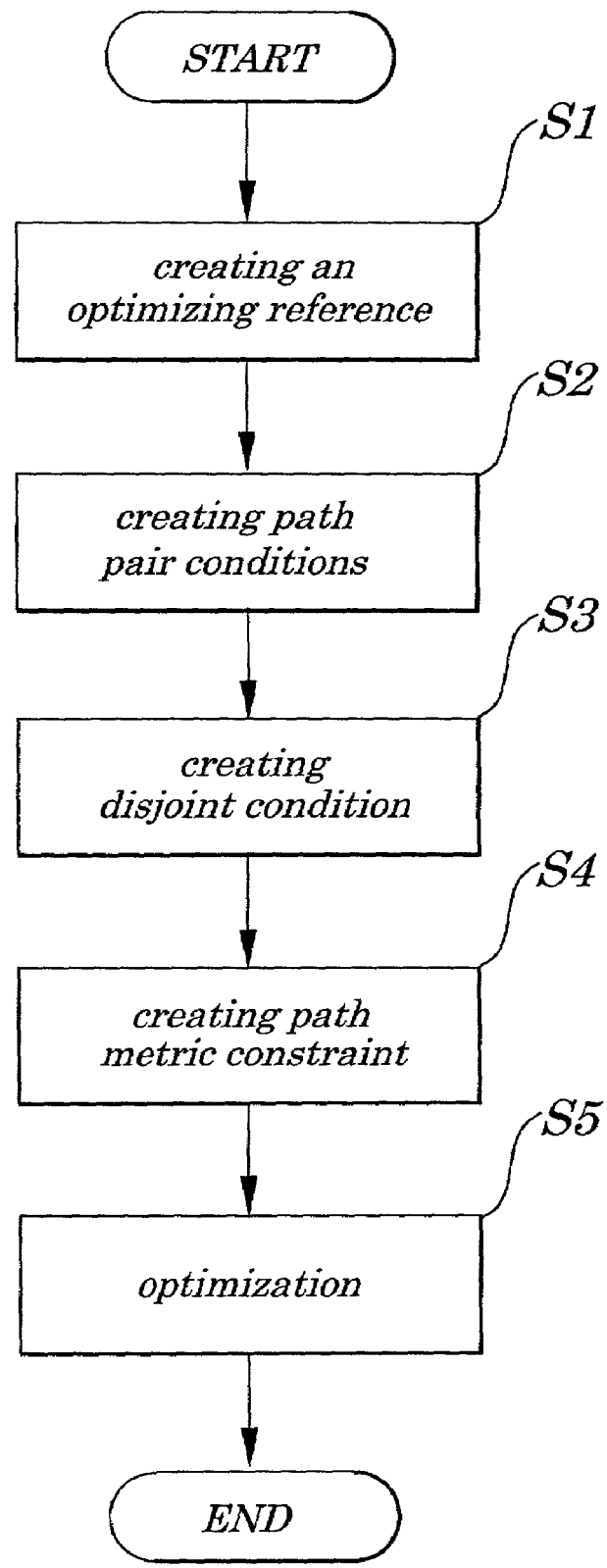
FIG. 2 is a flow chart illustrating an example of a method for designing a path pair of the present invention.

A method for designing a path pair of a first embodiment of the present invention will be explained by using drawings. FIG. 2 is a flow chart illustrating an example of a method for designing a path pair of the present invention.

Hereinafter, a value of a metric from an entrance node to an exit node is defined as a path metric. The path metric is a sum value of a metric value on each designed link. Moreover, a metric value of a path pair is defined as a path pair metric.

In the first embodiment, an example is provided in which a value of a path having a larger path metric, out of two paths making up a path pair, is set as a path pair metric and a path pair that minimizes the path pair metric is obtained. Moreover, if there is a plurality of path pairs in which values of paths having a larger path metric are same, a path pair in which a value of a metric of one path making up the pair is smallest is selected. The method shown in the first embodiment is used, for example, when a path pair that can provide a short delay is designed.

The path pair designing device, as shown in FIG. 2, performs processing of creating an optimizing reference (Step S1), processing of creating path pair conditions to produce a constraint expression being used to obtain a path pair (Step S2), processing of creating disjoint conditions to produce a constraint expression being used as a constraint condition for putting two paths making up a path pair in a disjoint state (Step S3), processing of creating a path metric constraint to produce a constraint expression being used as a constraint condition, which designates at least either of an upper limit value or a lower limit value of a path metric, for showing a range of a metric (Step S4), and processing of optimization to select a disjoint path pair by solving mathematical programming problem made up of expressions produced by processing of creating the optimizing reference, by processing of creating path pair conditions, by processing of creating disjoint conditions and by processing of creating a path pair metric constraint (Step S5). Moreover, in FIG. 2, an example is shown in which processing is performed in order to the processing of creating the optimizing reference, processing of creating path pair conditions, processing of creating disjoint conditions, processing of creating path metric constraints, and processing of optimization, however, the processing may be performed simultaneously or in arbitrary order.

First, in the processing of creating an optimizing reference (Step S1), for example, based on a reference (optimizing reference) used to select a path pair input through the input device 20, an objective function given by a following expression (1) is produced.

$$\text{Minimum } g_{p1}^{max} + Q g_{p2}^{max} \qquad \text{Expression (1)}$$

Moreover, in the above processing of creating an optimizing reference, as a constraint condition of a metric value of each path required for creating the above objective function, expressions (2) and (3) are provided.

$$\sum_{(i,j,k) \in L} g_{(i,j,k)} x^p_{(i,j,k)} \leq g_p^{max} \ (\forall p \in P) \qquad \text{Expression (2)}$$

$$g_{p1}^{max} \geq g_{p2}^{max} \qquad \text{Expression (3)}$$

Here, the expression (2) shows that the metric g (i, j, k) of each link on a commodity (path) "p" are summed and is set to $$g_p^{max}.$$

Moreover, the expression (3) shows that the path having a larger path metric out of the path pairs "p1 and p2" is set to be $$g_{p1}^{max}.$$

Next, the path pair designing device, as processing of creating path pair conditions (Step S2), produces a following constraint expression (4) being used as a condition required for selecting two paths (path pair) in the network.

$$\sum_{\{j,k:(i,j,k) \in L\}} x^p_{(i,j,k)} - \sum_{\{j,k:(j,i,k) \in L\}} x^p_{(j,i,k)} = \qquad \text{Expression (4)}$$

$$\begin{cases} 1 & i = s \\ 0 & i \neq s, t \ (\forall p \in P) \\ -1 & i = t \end{cases}$$

The expression (4) shows a conservation law of a network flow. That is, a left hand first term of the expression (4) represents an amount of a flow that comes in the node "i" for a commodity (path) "p" and a left hand second term of the expression (4) represents an amount of a flow that come out the node "1" for the commodity (path) "p". Moreover, a right side of the expression (4) shows that a flow spouts at an entrance node "s" (that is, in the case of a variable being "1") and a flow is sucked down into an exit node "t" (that is, in the case of a variable being "−1") and a flow passes at other nodes. Moreover, the variables "1" and "−1" denote all the flows that come in the node or come out from the node.

The expression (4) represents a constraint condition to allow a flow in two commodities (paths) to flow from the entrance node to the exit node, in other words, to make it possible to obtain two paths connecting the entrance node to the exit node.

Next, the path pair designing device produces constraint conditions (disjoint conditions), as the process of creating disjoint conditions (Step S3) to put the two paths into a disjoint state.

The disjoint condition includes a link (group) disjoint condition and a node disjoint condition. Only either of them may be produced or both of them may be produced.

A following expression (5) shows a constraint expression required to meet a link group disjoint condition. Moreover, if the link group is made up of one link, the state can be used as a link disjoint condition.

$$\sum_{(i,j,k) \in L^m} \sum_{p \in P} x^p_{(i,j,k)} \leq 1 \ (\forall m \in M^{nec}) \qquad \text{Expression (5)}$$

The left side in the expression (5) represents a total amount of a flow that passes through a link (i, j, k) and setting is made so that the total amount is "1" or less. That is, control is exerted so that one link can be used only by one commodity (path).

The following expression (6) shows a constraint expression required to satisfy a node disjoint condition.

$$\sum_{p \in P} \sum_{(i,k:(i,j,k) \in L)} x^p_{(i,j,k)} \leq 1 \ (\forall j \in N^{nec}, j \neq s, t) \qquad \text{Expression (6)}$$

The left side in the expression (6) represents a total amount of a flow that comes in the node "j" and setting is made so that the total amount is "1" or less. That is, control is exerted so that one link can be used only by one commodity (path).

Next, the path pair designing device produces, as processing of creating a path metric constraint (Step S4), a constraint expression to be used as a constraint condition to have a metric of the path pair fall within a specified range. The constraint expression is set arbitrarily if needed.

For example, the expression (7) is given as below which is a constraint condition required to set an upper limit value of a path metric.

$$\sum_{(i,j,k)\in L} g_{(i,j,k)} x^p_{(i,j,k)} \le g^{route\text{-}ul} \quad (\forall\ p \in P) \qquad \text{Expression (7)}$$

The expression (7) indicates that a total amount (left side) of a metric on a path "p" is set to be a predetermined upper limit value $g^{route\text{-}ul}$ or less.

Moreover, the expression (8) is given as below which is a constraint condition required to set a upper limit value of a path metric.

$$\sum_{(i,j,k)\in L} g_{(i,j,k)} x^p_{(i,j,k)} \ge g^{route\text{-}ll} \quad (\forall\ p \in P) \qquad \text{Expression (8)}$$

Also, the expression (9) is given as below which is a constraint condition to set a link metric on a path to be a predetermined upper limit value $g^{link\text{-}ul}$ or less.

$$g_{(i,j,k)} x^p_{(i,j,k)} \le g^{link\text{-}ul} (\forall (i,j,k)\in L, \forall p\in P) \qquad \text{Expression (9)}$$

Furthermore, the expression (10) is given as below which is a constraint condition to set a link metric on a path to be a predetermined lower limit value $g^{link\text{-}ll}$ or less.

$$g_{(i,j,k)} x^p_{(i,j,k)} \ge g^{link\text{-}ll}(\forall i,j,k)\in L, \forall p \in P) \qquad \text{Expression (10)}$$

When the expressions (1) to (10) are produced by processing of creating an optimizing reference, processing of creating path pair conditions, processing of creating disjoint conditions, processing of creating a path metric constraint, and processing of optimization, the path pair designing device solves mathematical programming problems including these constraints and objective functions and simultaneously selects two disjoint paths.

Moreover, to solve mathematical programming problems, for example, a mathematical programming method such as a cutting plane method, branch and bound method or a like can be used (see Mathematics handbook, compiled under a supervision of Yano, Morikita Publishing Co.,).

Also, as a result from the processing of optimization, if a plurality of path pairs is obtained, an arbitrary path pair may be selected from the plurality of path pairs. On the other hand, if the path pair can not be obtained, a network resource has to be changed to make a constraint condition be changed, the path pair designing device displays a message to inform that the path pair can not created on an output device 30.

As described above, according to the path pair designing method of the present invention, by producing a constraint expression being used as a condition required to obtain a path pair by processing of creating path pair conditions and having the constraint expression involved in the mathematical programming problem, two paths can be simultaneously selected without a process of creating the path, one by one, that has been employed in the conventional method. Moreover, by producing a constraint expression required for selecting a disjoint path through processing of creating a disjoint condition and by having the constraint expression involved in mathematical programming problems, so long as a network having a configuration that can provide a disjoint path is used, it is reliably possible to obtain two disjoint paths.

Second Embodiment

A path pair designing method of a second embodiment selects a path pair in which a sum of metrics of two paths is minimized. Contents of processing employed in the second embodiment are same as employed in the first embodiment except the processing of creating an optimizing reference. Only the processing of creating the optimizing reference is explained and descriptions of other processing are omitted accordingly.

In the processing of creating the optimizing reference of the second embodiment, an objective function that minimizes the sum of metrics of paths making up a path pair is produced.

The objective function is given by a following expression (11) shown below.

$$\text{Minimum} \sum_{p\in P} \sum_{(i,j,k)\in L} g_{(i,j,k)} x^p_{(i,j,k)} \qquad \text{Expression (11)}$$

By producing such the objective function as can be obtained by the expression (11), it is possible to acquire two paths that can satisfy a selection reference which is different from that in the first embodiment.

Third Embodiment

In the path pair designing method of the third embodiment, a minimum value of a link metric on a path is used as a value of a path metric. A path pair or a like in which a metric of a path having a smaller metric value, out of the two paths making up the path pair, is made maximum, can be selected.

If a plurality of path pairs satisfies the condition, a path pair is selected which has a largest path metric of other path making up the pair.

Contents of processing employed in the third embodiment are same as employed in the first embodiment except the processing of creating an optimizing reference. Only the processing of creating an optimizing reference is explained and descriptions of other processing are omitted accordingly.

In the third embodiment, following symbols are newly added. $b_{i,j,k}$: This represents an inverse number of a metric $g_{(i,j,k)}$ to be obtained. For example, when a maximum band is used as an index for the metric, $g_{(i,j,k)}$ denotes a band and $b_{i,j,k}$ denotes an inverse number of a band.

In the processing of creating an optimizing reference, an objective function and a constraint expression are set as follows.

As the objective function, a following expression (12) is produced.

$$\text{Minimum } b^{max}_{p1} + Q b^{max}_{p2} \qquad \text{Expression (12)}$$

Moreover, as a constraint expression required to obtain a path metric, a following expression (13) is produced as shown below.

$$b_{(i,j,k)} x^p_{(i,j,k)} \le b^{max}_{p1} + Q b^{max}_{p2} \quad \text{Expression (13)}$$

The expression (13) indicates that the minimum value out of the metric values on a link on a path "p" is set to be $$b^{max}_p.$$

On the other hand, a following expression (14) is produced as a constraint expression required to set a path having a larger path metric to be $$b^{max}_{p1}.$$

$$b^{max}_{p1} \ge b^{max}_{p2} \quad \text{Expression (14)}$$

Fourth Embodiment

In a path pair designing method of a fourth embodiment, an example obtained by extending the method employed in the first embodiment is shown in which a path pair is selected by taking into consideration a case where a metric is different between an upward flow and a downward flow.

Contents of processing employed in the fourth embodiment are same as employed in the first embodiment except the processing of creating an optimizing reference and of creating the path metric constraint. Only the processing of creating the optimizing reference and of creating the path metric constraint is explained and descriptions of other processing are omitted accordingly.

In the fourth embodiment, a following new expression (15) as shown below is produced as a constraint condition required to obtain a metric value in each of the paths in processing of creating an optimizing reference.

$$\sum_{(i,j,k) \in L} g_{(j,i,k)} x^p_{(i,j,k)} \le g^{max}_p (\forall p \in P) \quad \text{Expression (15)}$$

On a left side in the expression (15), corresponding to the expression using a metric $g_{(i,j,k)}$ of an upward flow shown by the expression (2), a path metric is obtained by using a metric $g_{(j,i,k)}$ of a (downward) flow in a reverse direction. The expression (15) indicates that the maximum value containing a path delay in an upward flow shown in the above expression (2) is set to be $$g^{max}_p.$$

Moreover, in the processing of creating a path metric constraint of the present invention, a following constraint expression, whenever necessary, is added to the constraint expression set in the first embodiment.

When the constraint expression (7) for the limit value of a path metric is used, a constraint expression (16) is produced together.

$$\sum_{(i,j,k) \in L} g_{(j,i,k)} x^p_{(i,j,k)} \le g^{route-ul} (\forall p \in P) \quad \text{Expression (16)}$$

The expression (16) indicates that a path pair metric of a downward flow is set to be a predetermined upper limit value or less.

Moreover, when a constraint expression (8) of a lower limit value of the path pair metric is used, a constraint expression (17) is produced together.

$$\sum_{(i,j,k) \in L} g_{(j,i,k)} x^p_{(i,j,k)} \ge g^{route-ll} (\forall p \in P) \quad \text{Expression (17)}$$

The expression (17) indicates that a path pair metric of a downward flow is set to be a predetermined upper limit value or more.

Moreover, when a constraint expression (9) for an upper limit value of a link metric is used, a following constraint expression (18) is produced together.

$$g_{(j,i,k)} x^p_{(i,j,k)} \le g^{link-ul} (\forall (i,j,k) \in L, \forall p \in P) \quad \text{Expression (18)}$$

The expression (18) indicates that a link metric of a downward flow is set to be a predetermined upper limit value or less.

Moreover, when the constraint expression (10) for the lower limit value of a link metric value is used, a following constraint expression (19) is produced together.

$$g_{(j,i,k)} x^p_{(i,j,k)} \ge g^{link-ll} (\forall (i,j,k) \in L, \forall p \in P) \quad \text{Expression (19)}$$

The expression (19) indicates that a link metric of a downward flow is set to be a predetermined lower limit value or more.

Thus, by producing the constraint expression and by having the constraint expression involved in mathematical programming problems, even when a path pair having a metric being different between an upward flow and a downward flow, an optimum path pair can be obtained by considering these metric values.

Fifth Embodiment

In a path pair designing method of a fifth embodiment, an example obtained by extending the method employed in the second embodiment is provided in which a path pair is selected by taking into consideration a case where a metric is different between an upward flow and a downward flow.

Contents of processing employed in the fifth embodiment are same as employed in the second embodiment except the processing of creating the optimizing reference and of creating the path metric constraint. Only the processing of creating an optimizing reference and of creating a path metric constraint of the fifth embodiment is explained and descriptions of other processing are omitted accordingly.

In the fifth embodiment, an objective function is changed as shown in a following expression (20) in the processing of creating an optimizing reference.

$$\text{Minimum} \sum_{p \in P} \sum_{(i,j,k) \in L} (g_{(i,j,k)} + g_{(j,i,k)}) x^p_{(i,j,k)} \quad \text{Expression (20)}$$

The expression (20) indicates an objective function required to obtain a minimum path pair by summing a link metric $g_{(i,j,k)}$ of an upward flow and a link metric $g_{(i,j,k)}$ of downward flow. Moreover, processing of creating the path metric is same as that in the fourth embodiment.

Sixth Embodiment

In a path pair designing method of a sixth embodiment, an example obtained by extending the method employed in the third embodiment is shown in which a path pair is selected by taking into consideration a case where a metric is different between an upward flow and a downward flow.

Contents of processing employed in the sixth embodiment are same as employed in the third embodiment except the processing of creating an optimizing reference and of creating a path metric constraint. Only the processing of creating the optimizing reference and of creating the path metric constraint of the sixth embodiment is explained and descriptions of other processing are omitted accordingly.

In the sixth embodiment, a new expression (21) as shown below is produced as a constraint condition required to obtain a metric value in each of the paths in processing of creating the optimizing reference.

$$b_{(i,j,k)} x^p_{(i,j,k)} \leq b^{\max}_p \quad (\forall\, (l, m, k) \in L, \forall\, p \in P) \quad \text{Expression (21)}$$

The expression (21) indicates that $$b^{\max}_p$$

is set with considerations given to an inverse number $b_{(i,j,k)}$ of a link metric of a downward flow.

Moreover, processing of creating the path metric is same as that in the fourth embodiment.

As described above, according to the path pair designing method of the sixth embodiment, if a network has a configuration that allows a disjoint path pair to be created using no same node or no same link, it is surely possible to obtain a disjoint path pair. Moreover, by changing an objective function indicating an optimized reference required to select a path pair, for example, a path pair or a like in which a metric of a path having a larger metric, out of the two paths making up the path pair, is made minimum, can be selected.

Also, even when a path pair is created in which a metric is different between an upward flow and a downward flow, an optimized path pair with considerations being considered can be obtained.

Furthermore, in the above descriptions, the processing of creating an optimizing reference, of creating path pair conditions, of creating disjoint conditions, of creating a path metric constraint, and of the optimization is performed by the processing device 10, however, the path pair designing device may be made up of a plurality of processing units each performing each separately processing described above.

EXAMPLE

Next, an example of operations of the path pair designing method will be described by referring to drawings.

Figure 3:
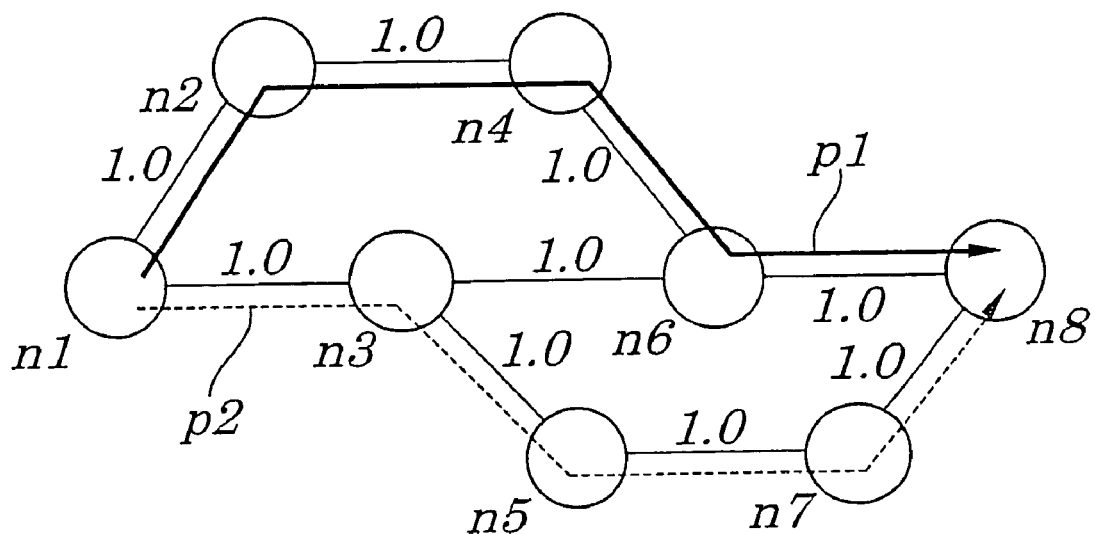
FIG. 3 is a schematic block diagram showing one example of a path pair created by the path pair designing method of the present invention.

FIG. 3 is a schematic block diagram showing one example of a path pair created by the path pair designing method of the present invention.

Figure 4:
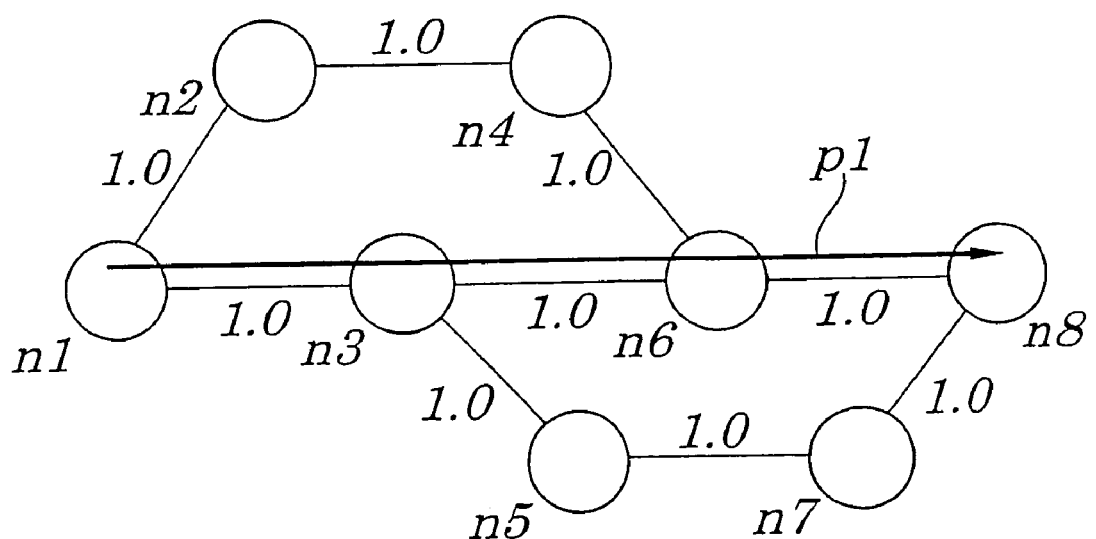
FIG. 4 is a schematic block diagram illustrating one example of a communication path created by a conventional path pair designing method.

As shown in FIG. 3, in the example, like the network shown in FIG. 4, a path pair connecting an entrance node n1 to an exit node n8 is designed using a network having 8 pieces of nodes n1 to n8 being connected through links. Hereinafter, each link is indicated by (na and nb) ("a" and "b" are positive numbers). For example, a link connecting a node n1 to a node 2 is represented by ("n1" and "n2").

Moreover, let it be presumed that connection is established between nodes by one link and one link makes up a group of links. Therefore, all "k" become 1.

Moreover, a value indicated by an italicized letter represents a metric value of each of the links. In the example shown in FIG. 3, the metric values for all the links are 1.0.

Also, let it be presumed that Q=0.9 and there is no constraint condition on a value of a path metric.

When a path pair is created between the entrance node n1 and the exit node n8 in such the network as described above, in the path pair designing method, an objective function given by a following expression (22) is produced in the processing of creating an optimizing reference using the above expression (1).

$$\text{Minimum } g^{\max}_{p1} + 0.9 g^{\max}_{p2} \quad \text{Expression (22)}$$

Moreover, by using the above expression (2) as a constraint condition required to acquire a metric value of each path, following equations (23) and (24) are produced.

$$1.0 x^{p1}_{n1,n2,1} + 1.0 x^{p1}_{n2,n1,1} + 1.0 x^{p1}_{n1,n3,1} + 1.0 x^{p1}_{n3,n1,1} + \quad \text{Expression (23)}$$
$$\ldots \text{same addition to be made for all links} +$$
$$\ldots \leq g^{\max}_{p1}$$

$$1.0 x^{p2}_{n1,n2,1} + 1.0 x^{p2}_{n2,n1,1} + 1.0 x^{p2}_{n1,n3,1} + 1.0 x^{p2}_{n3,n1,1} + \quad \text{Expression (24)}$$
$$\ldots \text{same addition to be made for all links} +$$
$$\ldots \leq g^{\max}_{p2}$$

Also, as a constraint condition required to set a path having a larger metric value to be $$g^{\max}_{p1},$$

following expression (25) is produced by using the above expression (3).

$$g^{\max}_{p1} \geq g^{\max}_{p2} \quad \text{Expression (25)}$$

Also, as a constraint condition required to create a path pair in the processing of creating path pair conditions, a following expression (26) is produced by using the above expression (4).

$$\left. \begin{array}{l} x^{p1}_{n1,n2,1} + x^{p1}_{n1,n3,1} - x^{p1}_{n2,n1,1} - x^{p1}_{n3,n1,1} = 1 \quad (\text{in } n1) \\ x^{p1}_{n1,n2,1} + x^{p1}_{n4,n2,1} - x^{p1}_{n2,n1,1} - x^{p1}_{n3,n4,1} = 0 \quad (\text{in } n2) \\ x^{p1}_{n6,n8,1} + x^{p1}_{n7,n8,1} - x^{p1}_{n8,n6,1} - x^{p1}_{n8,n7,1} = -1 \quad (\text{in } n3) \end{array} \right\} \quad \text{Expression (26)}$$

Also, as a constraint condition on a link disjoint, in the processing of creating the disjoint path pair condition, a following expression (27) is produced by using the above expression (5).

$$x^{p1}_{n1,n2,1} + x^{p2}_{n1,n2,1} \leq 1 \quad (\text{In}(n1, n2, 1)) \qquad \text{Expression (27)}$$

(same for other links)

Furthermore, as a constraint condition on node disjoint, in the processing of creating disjoint conditions, a following expression (28) is produced by using the above expression (6).

$$x^{p1}_{n1,n2,1} + x^{p2}_{n1,n2,1} x^{p1}_{n4,n2,1} + x^{p2}_{n4,n2,1} \leq 1 \quad (\text{in } n4) \qquad \text{Expression (28)}$$

(same for other links)

Finally, as the processing of optimization, mathematical programming problems made up of the expressions (21) to (28), a disjoint path pair is selected.

The path pair selected by the processing of optimization is made up of a path p1 (path passing through the nodes n1-n2-n4-n6-n8) and a path p2 (path passing through the nodes n1-n3-n5n7-n8). Thus, according to the path pair designing method, a disjoint path pair can be surely obtained.

It is apparent that the present invention is not limited to the above embodiments but may be changed and modified without departing from the scope and spirit of the invention.

What is claimed is:

1. A path pair designing method for creating a path pair made up of two disjoint communication paths that each passes through plural nodes and links in a network and does not pass through a same node or a same link in the network, said path pair designing method comprising:
    storing information about the plural nodes and links in a server;
    producing, in the server, a specified function for selecting an optimized said path pair;
    producing, in the server, a first condition that requires that said path pair is made up of two of the communication paths;
    producing, in the server, a second condition that requires that each of said two communication paths is in a disjoint state;
    simultaneously selecting, in the server, said two communication paths by using the stored information and the specified function constrained by the first and second conditions; and
    creating said optimized pair path made up of the two simultaneously selected communication paths.

2. The path pair designing method according to claim 1, further comprising an additional step of producing a third condition which designates at least one of an upper limit value and a lower limit value of a metric of said two communication paths making up said path pair, the specified function being further constrained by the third condition in the selecting step.

3. The method of claim 1, wherein said second condition requires that each of the links in the two communication paths of the path pair is used in only one of the two communication paths.

4. A path pair designing device for creating a path pair made up of two disjoint communication paths that each passes through plural nodes and links in a network and does not pass through a same node or a same link in the network, the device comprising a server, that is arranged to:
    store information about the plural nodes and links; produce a specified function for selecting an optimized said path pair; produce a first condition that requires that said path pair is made up of two of the communication paths;
    produce a second condition that requires that each of said two communication paths is in a disjoint state;
    simultaneously select said two communication paths by using the stored information and the specified function constrained by the first and second conditions; and
    create said optimized pair path made up of the two simultaneously selected communication paths.

5. The path pair designing device according to claim 3, wherein said server is further arranged to produce a third condition that designates at least one of an upper limit value and a lower limit value of a metric of each of said two communication paths making up said path pair, the specified function being further constrained by the third condition in the selecting step.

6. The device of claim 4, wherein said second condition requires that each of the links in the two communication paths of the path pair is used in only one of the two communication paths.

7. A computer program embodied in a computer readable medium, said computer program causing a central computer to design a path pair made up of two disjoint communication paths that each passes through plural nodes and links in a network and does not pass through a same node or a same link in the network, the computer program causing the central computer to carry out the steps of:
    storing information about the plural nodes and links in the central computer;
    producing, in the central computer, a specified function for selecting an optimized said path pair;
    producing, in the central computer, a first condition that requires that said path pair is made up of two of the communication paths;
    producing, in the central computer, a second condition that requires that each of said two communication paths is in a disjoint state;
    simultaneously selecting, in the central computer, said two communication paths by using the stored information and the specified function constrained by the first and second conditions; and
    creating said optimized pair path made up of the two simultaneously selected communication paths.

8. The computer program according to claim 7, further comprising an additional step of producing a third condition which designates at least one of an upper limit value and a lower limit value of a metric of said two communication paths making up said path pair, the specified function being further constrained by the third condition in the selecting step.

9. The computer program according to claim 7, wherein said second condition requires that each of the links in the two communication paths of the path pair is used in only one of the two communication paths.

* * * * *